(12) United States Patent
Mansberger

(10) Patent No.: US 11,754,040 B2
(45) Date of Patent: Sep. 12, 2023

(54) AUTOMATIC-AERODYNAMIC PITCH CONTROL FOR WIND TURBINE BLADE

(71) Applicant: Larry Lee Mansberger, Fort Worth, TX (US)

(72) Inventor: Larry Lee Mansberger, Fort Worth, TX (US)

(73) Assignee: Mansberger Aircraft Inc., Fort Worth, TX (US)

( * ) Notice: Subject to any disclaimer, the term of this patent is extended or adjusted under 35 U.S.C. 154(b) by 67 days.

(21) Appl. No.: 17/403,122

(22) Filed: Aug. 16, 2021

(65) Prior Publication Data
US 2023/0049189 A1    Feb. 16, 2023

(51) Int. Cl.
*F03D 7/02* (2006.01)
*F03D 1/06* (2006.01)
*F03D 80/70* (2016.01)

(52) U.S. Cl.
CPC ......... *F03D 7/0224* (2013.01); *F03D 1/0675* (2013.01); *F03D 80/70* (2016.05); *F05B 2240/52* (2013.01); *F05B 2270/328* (2013.01)

(58) Field of Classification Search
CPC ...... F03D 1/0675; F03D 7/0224; F03D 7/041; F03D 80/70; F05B 2240/52; F05B 2270/328
See application file for complete search history.

(56) References Cited

U.S. PATENT DOCUMENTS

| | | | |
|---|---|---|---|
| 4,083,651 A | 4/1978 | Cheney, Jr. et al. | |
| 4,116,585 A | 9/1978 | Maracic | |
| 4,575,309 A | 3/1986 | Brown | |
| 4,877,374 A | 10/1989 | Burkett | |
| 5,226,805 A | 7/1993 | Proven | |
| 6,761,533 B2 | 7/2004 | Favaro | |
| 7,172,392 B2* | 2/2007 | Wastling | F03D 7/0256 416/135 |
| 7,789,324 B2 | 9/2010 | Appa et al. | |
| 7,857,598 B2* | 12/2010 | McGeer | B63H 1/26 416/240 |

(Continued)

FOREIGN PATENT DOCUMENTS

WO    WO-2007048517 A1 *   5/2007   ........... F03D 1/0608

OTHER PUBLICATIONS

Machine Translation of WO 2007/048517A1, retrived from ESPACENET on Apr. 21, 2023 (Year: 2023).*

*Primary Examiner* — Courtney D Heinle
*Assistant Examiner* — Sang K Kim

(57) ABSTRACT

A wind turbine rotor blade assembly which incorporates automatic-aerodynamic control of the blade pitch angle is disclosed. The airfoil of the rotor blade (110) is free to rotate about a strategically located longitudinal blade axis which forms the spar stub (115) and is connected to the hub (120) of a horizontal axis wind turbine. The location of this blade axis is precisely set with respect to the turbine blade's aerodynamic center and center of mass. By further incorporating a reflexed airfoil with positive pitching moment this arrangement aerodynamically induces an automatic and self-regulating alignment of the rotor blade pitch such that the airfoil is always operating at or near optimal angle of attack. Details are disclosed on these strategic relationships which enable the successful operation of the new blade design.

4 Claims, 7 Drawing Sheets

(56) References Cited

U.S. PATENT DOCUMENTS

| | | |
|---|---|---|
| 8,070,446 B2 | 12/2011 | Potter et al. |
| 8,398,373 B2 | 3/2013 | Matsuda et al. |
| 8,430,634 B2 | 4/2013 | Williams |
| 8,454,313 B2 | 6/2013 | Elkin et al. |
| 8,573,937 B2 | 11/2013 | Preus |
| 8,622,698 B2 | 1/2014 | Kristoffersen |
| 8,702,390 B2 | 4/2014 | Sun |
| 9,057,358 B2 | 6/2015 | Xu |
| 9,062,650 B2 * | 6/2015 | Arlitt ................ F03B 13/24 |
| 9,200,616 B2 | 12/2015 | Lin |
| 9,382,897 B2 | 7/2016 | Mertens et al. |
| 9,581,132 B2 | 2/2017 | McCune |
| 10,018,179 B2 | 7/2018 | Betran Palomas |
| 10,107,259 B2 | 10/2018 | Kristoffersen et al. |
| 2009/0220340 A1 | 9/2009 | Pierce et al. |
| 2011/0211966 A1 | 9/2011 | Watts et al. |
| 2013/0014794 A1 | 1/2013 | Jin |
| 2014/0271183 A1 | 1/2014 | Barber |
| 2015/0093246 A1 | 4/2015 | Lee |
| 2018/0017040 A1 | 1/2018 | Lee |
| 2018/0328334 A1 | 11/2018 | Barber |

* cited by examiner

DETAIL B
High Pitch

AUTOMATIC-AERODYNAMIC PITCH CONTROL FOR WIND TURBINE BLADE

BACKGROUND OF THE INVENTION

This invention relates to the field of wind power engineering and in particular horizontal axis wind turbine blade design and blade pitch control. Optimizing the performance of the modern horizontal axis wind turbine has grown increasingly complex. In order to maximize the power extracted from the wind, the angle or pitch of the wind turbine blade needs to change with any change in wind velocity or generator rotational velocity. This is necessary to maintain an optimum angle of attack between the chord line of the airfoil and the relative airflow direction. The optimum angle of attack is considered to be that which produces the best lift to drag ratio for the chosen airfoil. The primary goal of any wind turbine blade pitch control system is to control this angle of attack.

Early prior art has accomplished this pitch change through spring loaded centrifugal governors and other complex mechanical assemblies to rotate the blades around their longitudinal axis. Mechanical means of regulation are not a precise method of control, as they typically do not sense the actual airfoil angle of attack, but rather react to the blade thrust and centrifugal loading of the turbine. Modern wind turbines more often incorporate computer controlled systems to operate complex electro-mechanical or hydraulic servos to move the blades about their longitudinal axis. These are expensive and complex systems requiring multiple sensors to feed back necessary information to the control software with an associated delay in mechanical response. Both mechanical and computer controlled systems require a considerable number of expensive moving parts which can affect their maintenance and reliability. The current state of the art in this field is typically too expensive or impractical to be incorporated into small and medium sized wind turbines. Most of these wind turbines compromise performance with fixed pitch blades which seldom operate at optimum pitch angle. With a fixed pitch turbine blade, start-up, cut-in speed and low wind performance are often compromised for high power output in high winds. Alternately if a fixed pitch turbine is configured for low wind performance, then the peak power of the turbine is sacrificed in high winds. Small and medium sized distributed wind energy systems could benefit greatly from a simpler, lower cost system of blade pitch control than is currently available.

The invention described here uses aerodynamic forces to automatically self-align the blade pitch to the optimal angle of attack, maximizing the performance of the wind turbine. The concept for this self-aligning turbine blade is based on the same aerodynamic principles used in the design of early flying wing gliders such as the Charles Fauvel's AV series and Al Backstrom EPB-1 Flying Plank. These tailless vintage gliders from the 1950s have the unique feature of achieving longitudinal stability based on the characteristics of their reflexed airfoils and without any required sweep or twist in their wing planform. A reflexed airfoil is an airfoil which has a camber line which turns upward toward the trailing edge. This gives the airfoil a positive pitching moment about the airfoils aerodynamic center or a nose up force. The longitudinal stability of an aircraft is achieved by locating the aircraft's center of gravity forward of the aerodynamic center. The trim or flight speed of the aircraft is a function of its angle of attack which is controlled by the distance between the center of gravity and the aerodynamic center and by the degree of reflex in the trailing edge of the airfoil. In the case of the new turbine blade design presented here, the longitudinal axis is analogous to what would be the center of gravity of the flying wing aircraft as the turbine blade is furthermore mass balanced about this axis. In the implementation of this blade pitch control method, what would be the relative position of center of gravity of the wing to the aerodynamic center now becomes the relative position of the turbine blade longitudinal axis to the blade aerodynamic center. No prior art was found which detailed how to use this aerodynamic force relationship to the longitudinal axis as a method to automatically self-align the wind turbine blade to its optimum angle of attack.

BRIEF SUMMARY OF THE INVENTION

This invention is for the design of a wind turbine blade for a horizontal axis wind turbine with a new means of automatic aerodynamic blade pitch control. The supporting spar stub of the turbine blade carries loads to the hub of the wind turbine which drives a conventional electrical generator or other power extraction device. In this design, the supporting spar stub of the individual wind turbine blade is an axial shaft mounted on multiple bearings allowing the blade airfoil to rotate freely around its longitudinal axis. This rotation may be held within desired limits provided by mechanical stops. The blade longitudinal axis is strategically located forward of the aerodynamic center of the blade airfoil. The blade airfoil is a reflexed airfoil with a positive pitching moment and the blade assembly is mass balanced around the blade longitudinal axis. The turbine blade aerodynamically positions itself around this axis to a trimmed angle of attack. This trim setting may be controlled by either adjusting the static margin or the degree of reflex in the airfoil design. The configuration is chosen such that the airfoil is always operating at or near its optimal angle of attack for given conditions of wind and rotational velocity. This is normally achieved by trimming the airfoil for the angle of attack producing the airfoil's highest lift to drag ratio. Any perturbation in the system such as change in wind speed or rotational velocity causes the airfoil pitch to automatically rotate to the trimmed setting.

This disclosed embodiment of aerodynamic blade pitch control is an innovative solution which will benefit all wind turbines from the smallest to the largest utility scale. When large grid-tied turbines are required to match their rotational velocities to factors of the grid frequency, this invention will allow efficient and independent blade adjustment as the individual blades travel through different wind velocity conditions. A further advantage to independent aerodynamic blade pitch control is in automatic load dampening. When an individual blade or entire rotor encounters a wind gust, these blades react in an automatic manner lowering the relative angle of attack, relieving the gust load factor, dampening the loads and reducing fatigue stress which will ultimately extend the life of the blades.

NOMENCLATURE

The following variables and nomenclature are used in the figures and detail description:
$F_t$=tangential force, parallel to rotor plane
$F_n$=normal force perpendicular to rotor plane
$F_R$=resultant force of vectors
L=lift
D=drag
$M_{ac}$=pitching moment of the airfoil about the aerodynamic center
$M_{om}$=moment about the center of mass
$x_{ac}$=distance from the leading edge to the aerodynamic center of the mean aerodynamic chord
$x_{cm}$=distance from the leading edge to the center of mass of the mean aerodynamic chord
$c_{mac}$=length of the mean aerodynamic chord
$\sigma$=static or stability margin=$(x_{ac}-x_{cm})/c_{mac}$
$\alpha$=angle of attack of the airfoil defined as angle between the relative airflow and the chord line
$\theta$=pitch angle of blade defined as angle between chord line and plane of rotation
$\phi$=the angle between the relative airflow and the plane of rotation
$V_0$=wind velocity, freestream
$a_i$=the inflow velocity ratio
$a_iV_0$=the induced velocity near the blade
$\Omega$=the local angular velocity
r=the local blade radius
$V_{rel}$=the velocity of airflow relative to the blade airfoil

DETAILED DESCRIPTION OF THE INVENTION

Figure 1:
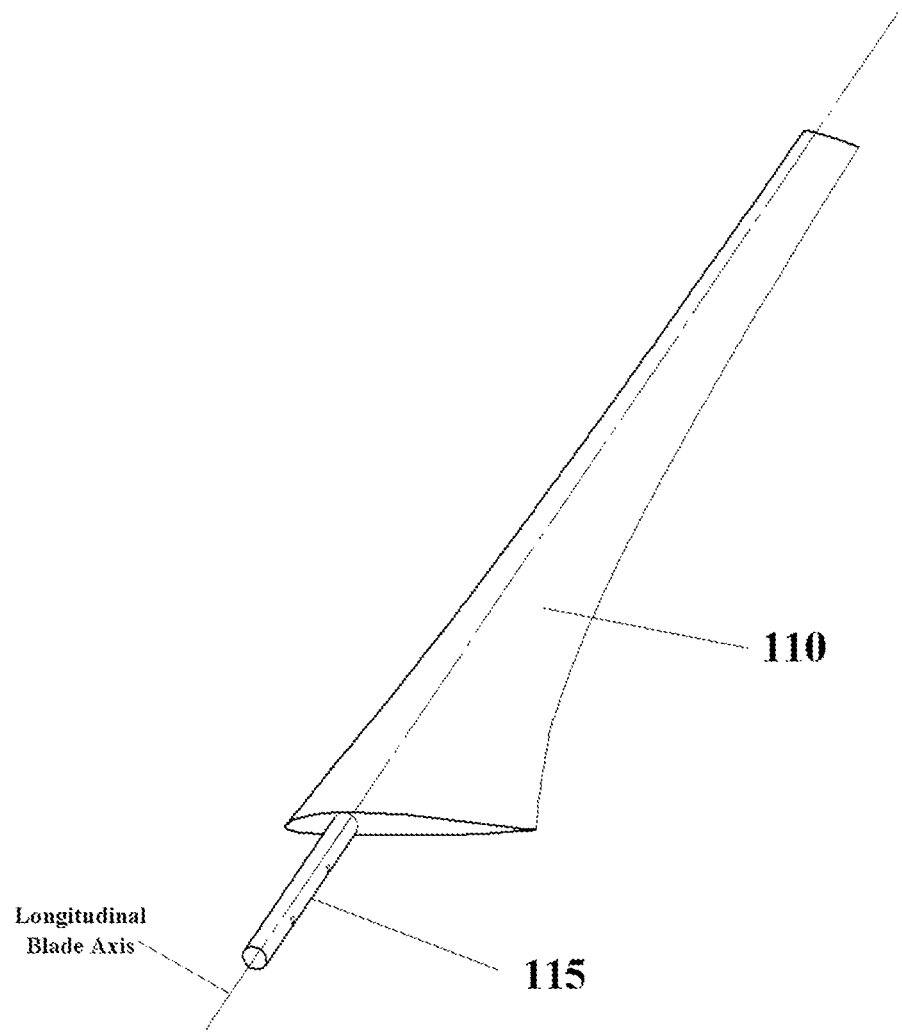
FIG. 1 is a perspective view of the rotor blade showing the spar extension and the longitudinal axis.
Figure 2:
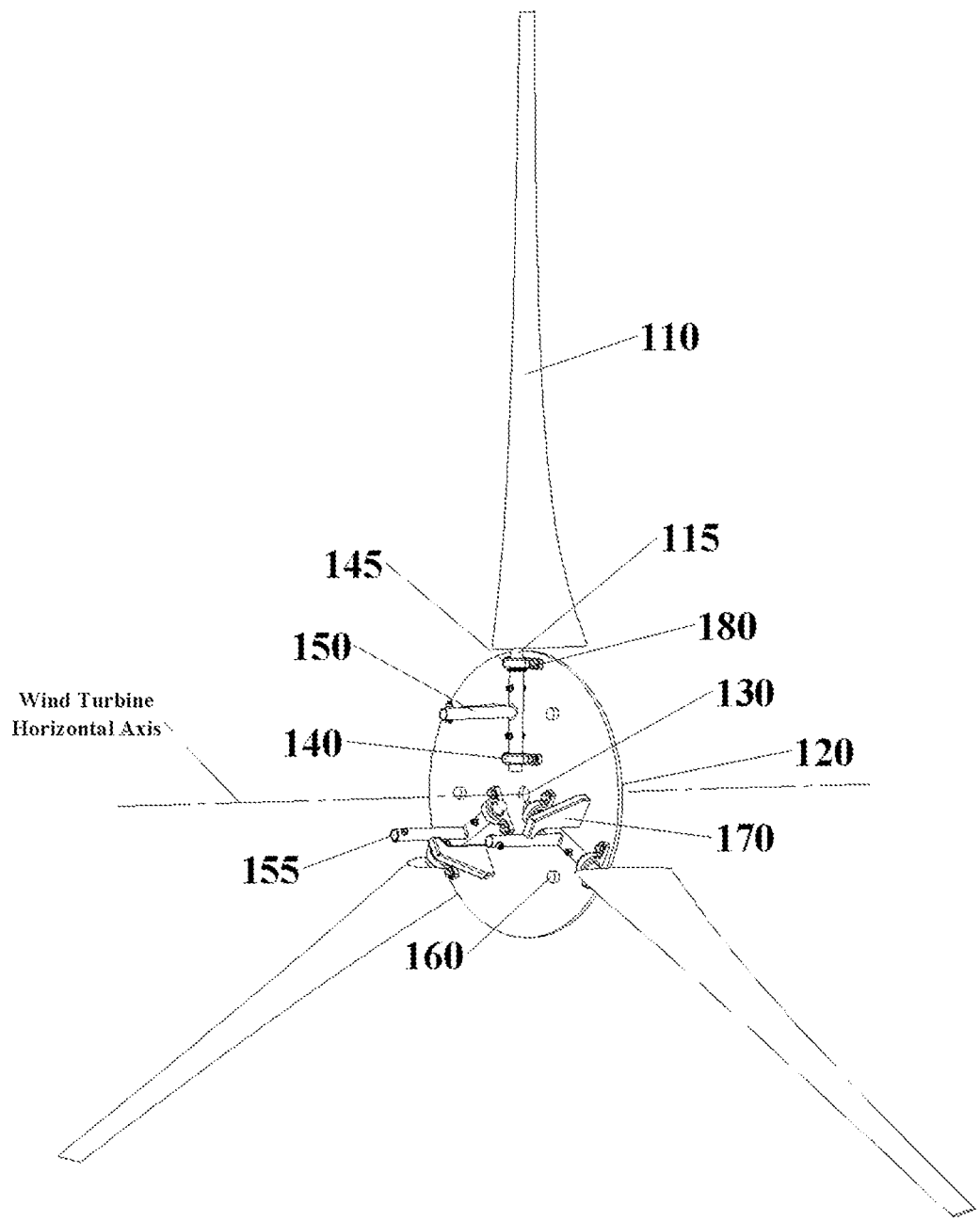
FIG. 2 is a perspective view of the overall blade assembly for a three blade embodiment of a horizontal axis wind turbine assembly.
Figure 3:
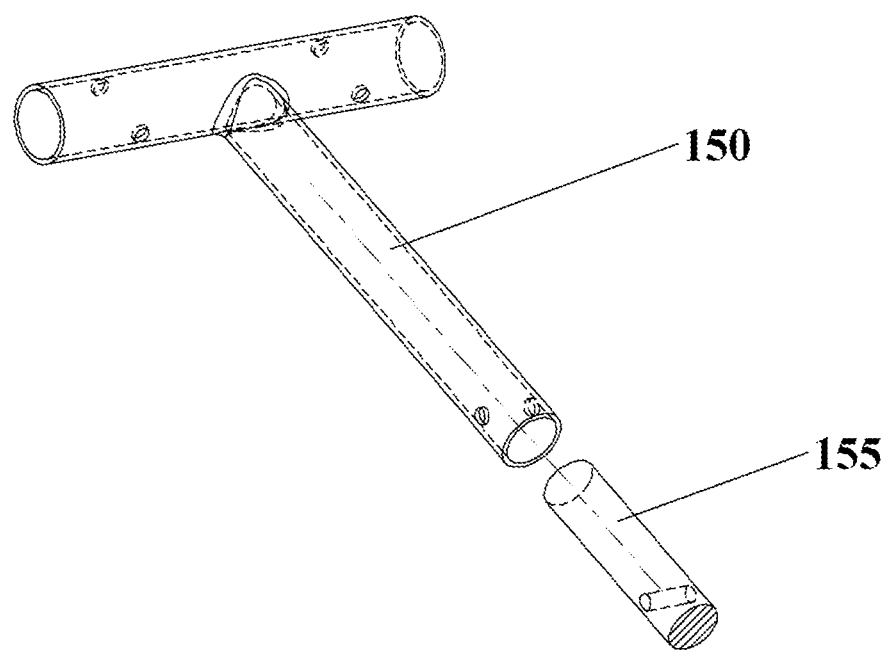
FIG. 3 is an exploded perspective view of a balance arm and example of an internal weight.
Figure 4:
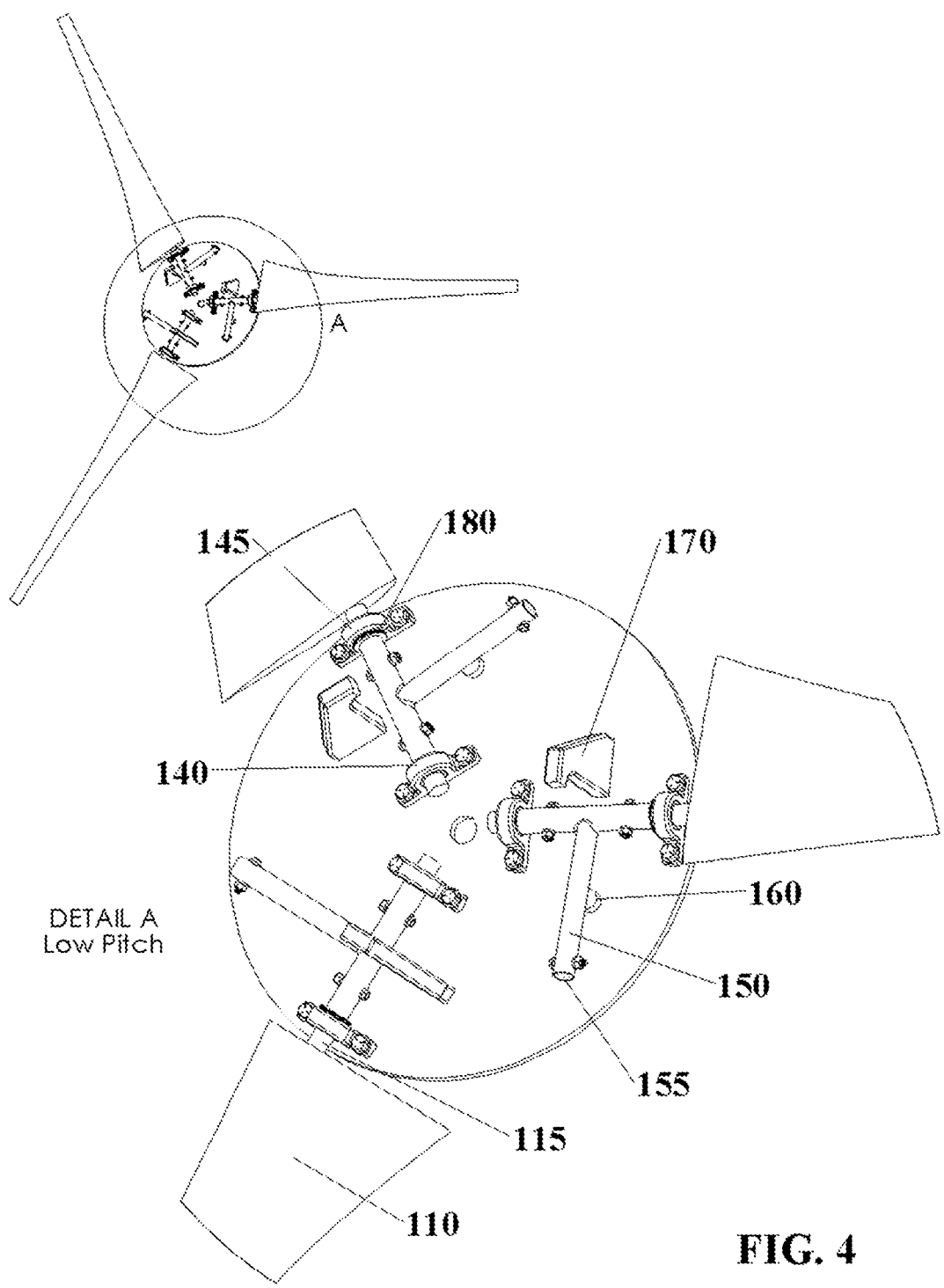
FIG. 4 is a detail view of the hub assembly with the rotor blade in a low pitch position with the balance arm near the low pitch stop.
Figure 5:
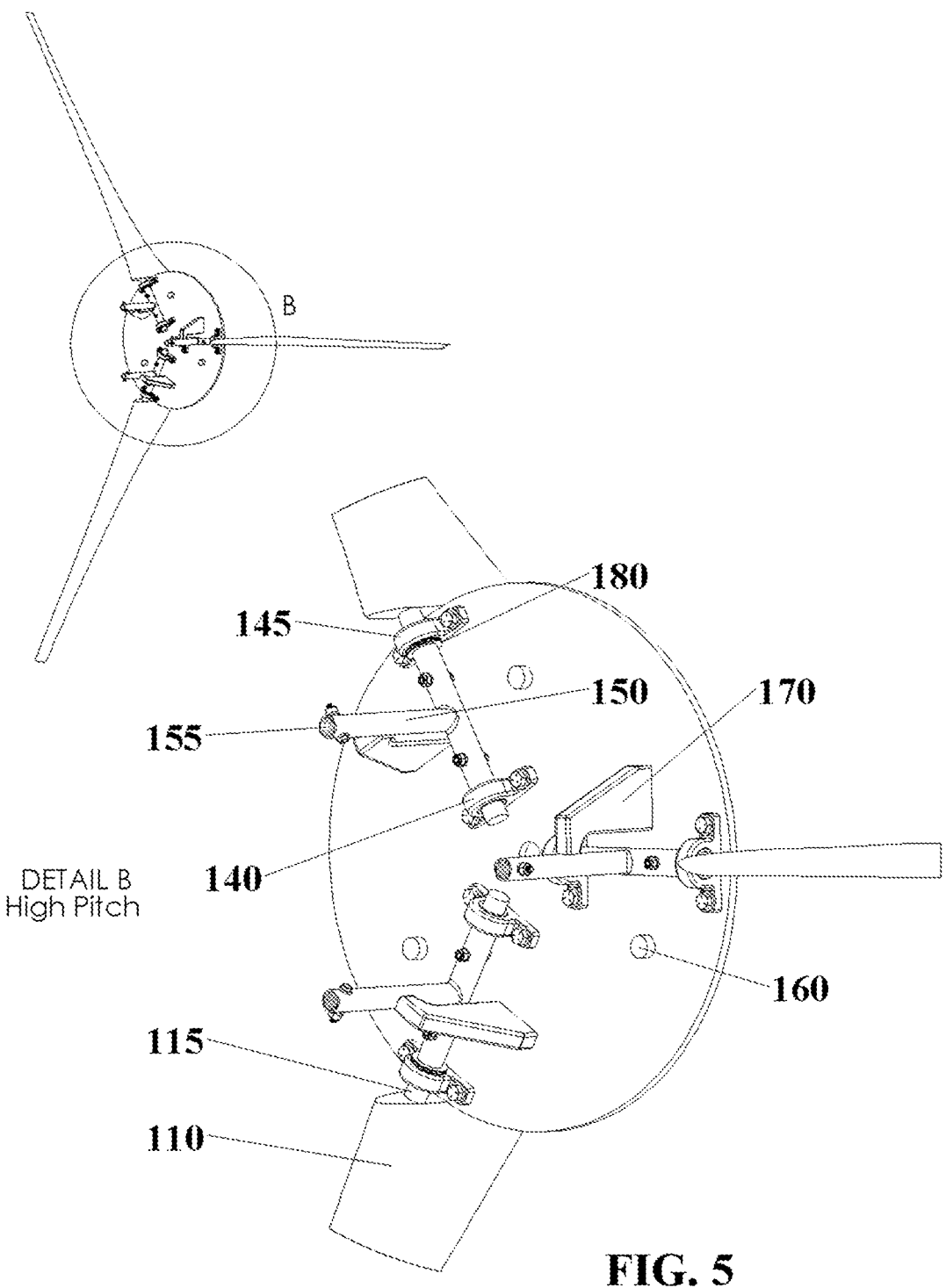
FIG. 5 is a detail view of the hub assembly with the rotor blade in a high pitch position with the balance arm near the high pitch stop.

This invention is for the design of a rotor blade for a horizontal axis wind turbine which incorporates automatic-aerodynamic control of the blade pitch angle $\theta$. This aerodynamic control is accomplished through the strategic trimming of an inherently-stable turbine blade designed with a reflexed airfoil. FIG. 1 is of a fundamental wind turbine blade 110 showing at the root an axial extension herein called a spar stub 115. The spar stub 115 is an axial extension of a typical internal-structural spar not shown. FIG. 2 shows an overall view of one embodiment of a wind turbine blade assembly consisting of three blades, but other embodiments may contain any plurality of blades. In FIG. 2 a hub 120 and its center 130 are shown with respect to the horizontal axis of a wind turbine. The hub 120 is mechanically attached through its center 130 to the drive shaft of a conventional electrical generator or other power extraction device, not shown. In FIG. 2 the spar stub 115 of the turbine blade can be seen to transfer loads to the hub 120 of the wind turbine through at least an inner bearing mount assembly 140 and an outer bearing mount assembly 145. The bearing mount assemblies 140 and 145 allow the blade airfoil to rotate freely around the longitudinal axis of the blade. The individual blades are further mass balanced about the blade longitudinal axis by a weight 155 affixed to the outside of or inserted and attached inside of a balance arm 150 as shown in FIG. 3. The balance arm 150 is in approximate alignment with the root airfoil section of the blade 110 and mechanically attached to the spar stub 115 between the bearing assemblies 140 and 145. The mechanical attachment of the balance arm 150 to the spar stub 115 also serves to transfer the centrifugal loads of the blade 110 into the hub 120 by means of an axial thrust bearing 180 which seats against the outer bearing mount assembly 145. The rotation of the blade around its longitudinal axis is furthermore held within desired limits provided by mechanical stops, a low pitch stop 160 and a high pitch stop 170. The balance arm makes contact with the low pitch stop 160 and the high pitch stop 170 limiting the angular travel of the blade 110 about its longitudinal axis. These stops can be seen acting against the balance arm 150 in the detail drawings FIG. 4 of a low pitch position and FIG. 5 of a high pitch position. The desired limits of angular travel of the blade around its longitudinal axis are such that the low pitch stop allows the tip airfoil section to reach the angle of pitch which maximizes the power output. The low pitch limit will depend on the airfoil choice, design wind speed and design rotational velocity of the electrical generator, but will typically range from +5 degrees to −10 degrees of pitch. The limit for the high pitch stop is that which permits the earliest startup of the turbine rotation by producing the maximum torque $F_t$ from the non-rotating wind turbine blade. The high pitch stop will work best when set between 75 degrees and 90 degrees of pitch relative to the root airfoil section.

Figure 6:
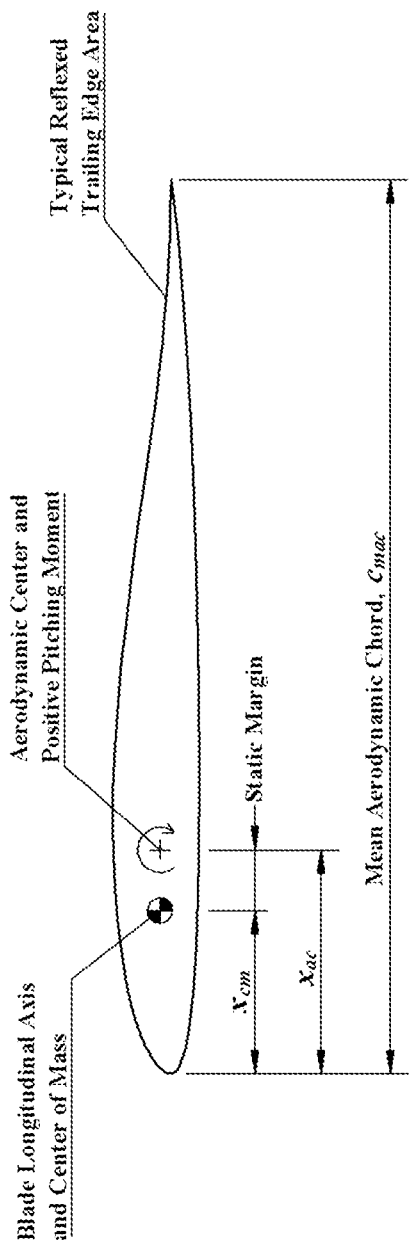
FIG. 6 is a two dimensional drawing of a typical reflexed airfoil section and important nomenclature.
Figure 7:
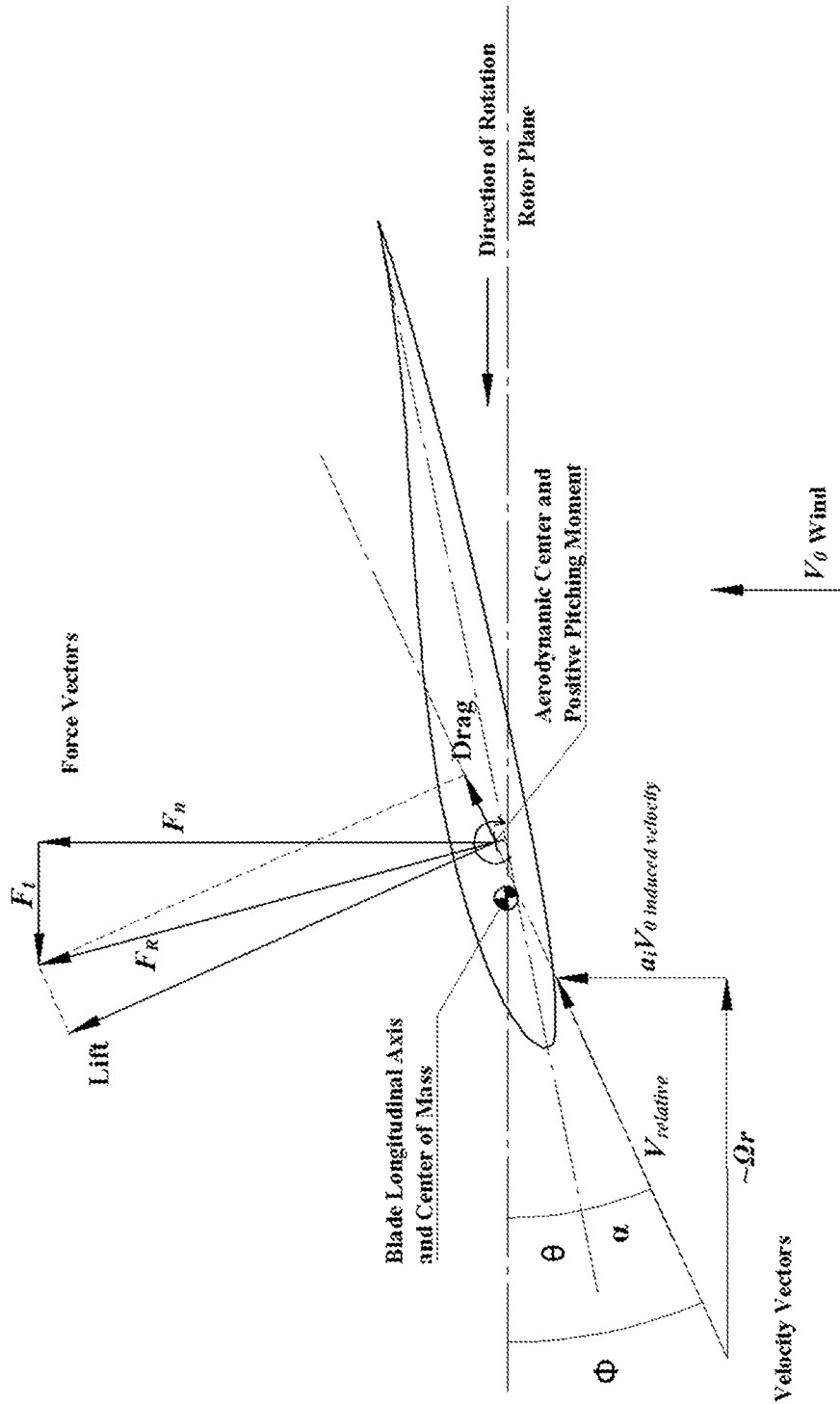
FIG. 7 is a two dimensional drawing of the representative mean aerodynamic airfoil showing the relative force and velocity vectors.

The blade longitudinal axis formed by the spar stub 115 is strategically located forward of the aerodynamic center of the mean aerodynamic chord. FIG. 6 is a two dimensional drawing depicting this relationship on a typical reflexed airfoil section. The aerodynamic center is defined here as the point on the airfoil about which the lift and drag forces and the pitching moment are considered to act. Within normal operating ranges and small angles of attack the aerodynamic center is typically located approximately one quarter of the mean aerodynamic chord dimension aft of the airfoil section leading edge. The chord line is defined as the straight line between the leading edge and trailing edge of the airfoil. The mean aerodynamic chord is that airfoil section and its location which is representative of the aerodynamic center of the overall blade. FIG. 6 shows these relationships including the orientation of a positive pitching moment and corresponding dimensions $x_{ac}$, $x_{cm}c_{mac}$ which are used to define the shown static margin. The static margin in this case is defined as the dimension between the blade longitudinal axis and the aerodynamic center of the airfoil expressed in percent of mean aerodynamic chord dimension. FIG. 7 is a two-dimensional drawing of a representative mean aerodynamic airfoil of the blade 110 showing force and velocity vectors relative to the blade longitudinal axis and the aerodynamic center of the airfoil section for a trimmed position. A trimmed position refers to a steady condition of force and moment balanced about the center of mass and in this case the longitudinal axis of the blade. The parameter to be trimmed is the angle of attack of the airfoil. Referring to FIG. 7, the trimmed position occurs when mathematically the sum of the moments about the center of mass of the mean aerodynamic chord equal zero; $\Sigma M_{cm}=M_{ac}-F_R(x_{ac}-x_{cm})\cos(\alpha-\tan^{-1}(D/L))=0$, which for normally small angles simplifies to $\Sigma M_{cm} \approx M_{ac}-L(x_{ac}-x_{cm})=0$. This trim setting may be controlled by either adjusting the static margin or the degree of reflex in the airfoil design. The configuration is chosen such that the airfoil is always operating at or near its optimal angle of attack for given conditions of wind and rotational velocity. This is normally achieved by trimming the airfoil for the angle of attack producing the airfoil's highest lift to drag ratio.

Referring to FIG. 7 if the wind velocity increases, both the angle of the relative flow $\phi$ and the angle of attack of the airfoil $\alpha$ increase, then consequently the lift and drag vectors increase. This causes an increase in the resulting vector $F_R$ and a negative pitching moment about the longitudinal blade axis. The blade airfoil responds by decreasing the angle of attack until the sum of the moments is again zero. Conversely if the wind velocity decreases, both the angle of the relative flow $\phi$ and the angle of attack of the airfoil $\alpha$ decrease, then consequently the lift and drag vectors decrease. This causes a decrease in the resulting vector $F_R$ and a positive pitching moment about the longitudinal blade axis. The blade airfoil responds by increasing the angle of attack until the sum of the moments is again zero. In this manner the turbine blade airfoil aerodynamically positions itself around the blade longitudinal axis to a trimmed angle of attack.

Concurrently the system must be stable in that any perturbation in the system such as a change in wind speed or rotational velocity must cause the airfoil pitch to automatically rotate back to the trimmed position without excessively overshooting or oscillating. Neutral stability occurs when the static margin is equal to zero and positive stability increases with increasing static margin. Depending on airfoil, planforms, and stability requirements, static margins between 1% and 8% of the mean aerodynamic chord have been experimentally shown to provide necessary stability and performance.

FIG. 7 shows in a similar manner the blade pitch will automatically adjust for changes in electrical load when the wind turbine is configured with a variable speed electrical generator. When more electrical demand is placed on a permanent magnet alternator more torque or more rotational velocity are required to meet the power demand. If additional torque is not available from the system such as with a fixed blade, then the rotational velocity will decrease and eventually the rotor blades will stall. With this automatic-aerodynamic pitch control, if the rotational velocity decreases due to load, then both the angle of the relative flow $\phi$ and the angle of attack of the airfoil $\alpha$ increase and consequently the lift and drag vectors increase. This causes an increase in the resulting vector $F_R$ and a negative pitching moment about the longitudinal blade axis. The blade airfoil responds by decreasing the angle of attack until the sum of the moments is again zero. This prevents the blade from stalling and consequently the tangential vector $F_t$ and the corresponding torque increase. Within power limitations this effectively smooths the rotational speed of the turbine and increases its peak power beyond the capability of a fixed pitch blade.

A major advantage to this aerodynamic pitch control is with wind turbine start up. Normally fixed pitch wind turbine blades start out at an inefficient stalled angle of attack, making initial startup difficult. With this aerodynamic pitch control any significant wind causes the blades to rotate into a high pitch position, this allows the blades to start out at a very efficient angle of attack and smoothly adjust to lower pitch angles as the turbine rotation accelerates.

Most large turbines operate within wind gradients which cause different blades to experience different conditions. A further advantage of this automatic-aerodynamic blade pitch control is its capability of automatically adjusting blade pitch independently to optimize overall performance in non-uniform wind velocities. Another advantage to independent aerodynamic blade pitch control is in automatic load dampening. When an individual blade or entire rotor encounters a wind gust, these aerodynamically controlled blades will react in an automatic manner lowering the relative angle of attack, relieving the gust load factor, reducing and dampening the fatigue stresses; therefore, extending the life of the blades.

Utility scale and many grid-tied wind turbines require matching rotational velocities to factors of the grid frequency. This becomes the on-design rotational velocity for a given wind speed and blade configuration. With fixed pitch blades, performance is always a compromise at off-design conditions. The aerodynamic pitch control maximizes performance by optimizing the angle of attack regardless of any off-design conditions.

The low pitch stop 160 can also be used to regulate the peak power of the wind turbine. As the rotational velocity of the wind turbine increases with increasing wind velocity the balance arm eventually reaches the low pitch stop setting and the blade effectively becomes a fixed pitch blade. By adjusting the low pitch stop limit the wind turbine can be stall-regulated in the same manner as other fixed pitch wind turbines. This gives the wind turbine the advantages of a complex variable pitch system but with the ability for simple stall-regulation of power.

Another embodiment of the invention may use mechanically controlled flap sections to vary the incidence of the airfoils trailing edge reflex. This would allow the desired angle of attack to be further optimized for different wind conditions, power, or angular velocity requirements. Further embodiments could vary in many external and internal details. The wind turbine itself could be of the upwind or downwind configuration. The entire pitch control mechanism may be housed within an aerodynamic enclosure, nacelle, fairing, or spinner. The wind turbine rotor blades may be surrounded by an airfoil shaped ring, a diffuser, or other ducted enclosure to increase the overall wind turbine performance. The wind turbine assembly could be of any number of blades. The blades and all herein described components may be fabricated from any suitable materials and mechanically fastened by any conventional means by those skilled in the particular art. The scope of the invention to be protected is as defined in the claims and it is expressly intended that all variations within the spirit and scope as defined within the claims are thereby included.

What is claimed is:

1. A wind turbine rotor blade comprised of a reflexed airfoil formed along a longitudinal axis of said blade with said longitudinal axis centered on an extension of the structural spar of said blade thusly forming a spar stub which transfers loads to a rotor hub through the means of at least two axial bearings and one centrifugal thrust bearing allowing the blade to rotate freely around said longitudinal axis which is furthermore located forward of the aerodynamic center of the mean aerodynamic airfoil of said blade and in which said blade is mass balanced about said blade's longitudinal axis and wherein the angle of attack of the blade with the relative airflow and the subsequent pitch of the blade are self-aligning due to the aerodynamic forces.

2. The wind turbine rotor blade of claim 1 in which the longitudinal axis of said blade rotation is located forward of the airfoil mean aerodynamic center by a distance of between 1% and 8% of the mean aerodynamic chord of the blade planform.

3. The wind turbine rotor blade of claim 1 containing a mass balance arm mechanically attached to said spar stub between said supporting axial bearings and said centrifugal thrust bearing and with said balance arm containing a weight for the purpose of providing mass balance of the assembly around the axis of said spar stub.

4. The wind turbine rotor of claim 3 in which the free movement of the airfoil about the blade longitudinal axis of rotation is limited by the contact of said balance arm with two mechanical stops, a low pitch stop set between +5 degrees and −10 degrees pitch relative to the tip airfoil section and a high pitch stop set between 75 degrees and 90 degrees relative to the root airfoil section.

\* \* \* \* \*